(12) United States Patent
Chen

(10) Patent No.: US 10,908,418 B1
(45) Date of Patent: Feb. 2, 2021

(54) NAKED EYE 3D HEAD-UP DISPLAY DEVICE WITH REFLECTIVE DIFFUSER SHEET

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 0 days.

(21) Appl. No.: 16/525,563

(22) Filed: Jul. 29, 2019

(51) Int. Cl.
*G02B 27/00* (2006.01)
*H04N 13/363* (2018.01)
*G02B 27/01* (2006.01)

(52) U.S. Cl.
CPC ........ *G02B 27/0093* (2013.01); *H04N 13/363* (2018.05); *B60W 2554/00* (2020.02); *G02B 2027/014* (2013.01); *G02B 2027/0134* (2013.01); *G02B 2027/0187* (2013.01)

(58) Field of Classification Search
CPC ........................ G02B 27/0179; G02B 27/0101; G02B 30/22; G02B 27/02
See application file for complete search history.

(56) References Cited

U.S. PATENT DOCUMENTS

| 6,057,878 | A | * | 5/2000 | Ogiwara | H04N 13/211 348/56 |
|---|---|---|---|---|---|
| 2016/0091861 | A1 | * | 3/2016 | Liu | G03H 1/268 359/9 |
| 2019/0025580 | A1 | * | 1/2019 | Nagano | G02B 27/64 |
| 2019/0033576 | A1 | * | 1/2019 | Oster | H01L 41/0966 |

* cited by examiner

*Primary Examiner* — Kevin M Nguyen
(74) *Attorney, Agent, or Firm* — Guice Patents PLLC

(57) ABSTRACT

The present invention relates to a naked eye 3D head-up display device with reflective diffuser sheet, which includes a projection module and a reflective diffuser sheet, an array of micro-mirrors is set on the reflective diffuser sheet, the array of micro-mirrors is divided into a left-eye micro-mirror group and a right-eye micro-mirror group, image light with left-eye pixels and image light with right-eye pixels projected by the projection module are provided to separately aim at the left-eye micro-mirror group and the right-eye micro-mirror group, so that two eyes of the driver may separately receive images with different parallax, to thereby generate a 3D stereoscopic image.

10 Claims, 22 Drawing Sheets

NAKED EYE 3D HEAD-UP DISPLAY DEVICE WITH REFLECTIVE DIFFUSER SHEET

BACKGROUND OF THE INVENTION a) Field of the Invention

The present invention relates to a naked eye 3D head-up display device with reflective diffuser sheet and, more particularly, to a naked eye 3D head-up display device with reflective diffuser sheet for solving the problem that 3D images may be interrupted if a driver moves his head, which provides images with different parallax for a driver to receive respectively by two eyes, to provide better 3D stereoscopic images, to thereby improve driving safety.

b) Description of Prior Art

The head-up display technology recently used in vehicles is an optical system, which is generally consisted of two main devices, a projector and a combiner; the projector is consisted of a signal source, a projection mirror and other optical components; the signal source of the projector may be provided based on LCD liquid crystal display, or combined with a projector and a display screen, light is emitted from the signal source and projected to the combiner or a special transparent screen set on a glass by the projector, the combiner is provided to show characters or images overlapped with real sights.

Relative technology could be referred to cited references JP3526157, TW 1634869, TW 1622505, TW announcement number 396280, TW announcement number 434444, TW announcement number 578011, TW 1649590, TW 1609199, TW 1646375, TW publication number 201730628.

The most typical representative is JP3526157, the technical feature is referred to show in FIG. 1 and FIG. 2, in the cited reference, an image display device using binocular parallax is achieved to enable stereoscopic viewing without wearing special glasses, wherein the directional reflection screen consisting of two planes perpendicular alignment mirror group, users can observe stereoscopic images. In order to let more people observe stereoscopic images in horizontal direction simultaneously, the image display device can also be consisted of various angle mirror groups, the structure is similar to a columnar cone mirror A, besides, a wavy structure B is set in vertical direction for vertical diffuse reflection.

Most of the above cited references have already improve the technology of head-up display devices, but some drawbacks still need to be overcome. For example, a driver have to move or turn his head to observe the surrounding road conditions or during driving, adjusting to different sitting posture, or a different driver with different height and posture, at this time, the position of the eyes may not be temporarily or continuously in the area of the eye box for 3D images, so the problem that 3D images are interrupted or invalid may happen, these are problems to be solved.

SUMMARY OF THE INVENTION

In view of this, the inventor finally completed the naked eye 3D head-up display device with reflective diffuser sheet of the present invention after numerous improvements, namely, the object of the present invention is to provide a naked eye 3D head-up display device with reflective diffuser sheet for solving the problem that 3D images may be interrupted if a driver moves his head, which provides images with different parallax for a driver to receive respectively by two eyes, to provide better 3D stereoscopic images, to thereby improve driving safety.

To achieve the object of the present invention, the naked eye 3D head-up display device with reflective diffuser sheet of the present invention includes:

a projection module, which is provided to project an image light;

a reflective diffuser sheet, an array of micro-mirrors is set on it, the image light is projected to the reflective diffuser sheet;

the feature is that the array of micro-mirrors is divided into a left-eye micro-mirror group and a right-eye micro-mirror group, the left-eye micro-mirror group and the right-eye micro-mirror group are staggered in the reflective diffuser sheet corresponding to the left eye and the right eye of the driver, the image light is provided to project a parallax image with staggered image light with left-eye pixels and image light with right-eye pixels, the image light with left-eye pixels aims at the left-eye micro-mirror group of the reflective diffuser sheet, the image light with right-eye pixels aims at the right-eye micro-mirror group of the reflective diffuser sheet, so that two eyes of the driver may separately receive images with different parallax, to thereby generate a 3D stereoscopic image.

The naked eye 3D head-up display device with reflective diffuser sheet of the present invention further includes a reflector, the reflective diffuser sheet is provided to reflect the image light to the reflector, the reflector is provided to reflect the image light to the position of an eye box of the driver.

The naked eye 3D head-up display device with reflective diffuser sheet of the present invention further includes a reflector and a windshield, the reflective diffuser sheet is provided to reflect the image light to the reflector, the reflector is provided to reflect the image light to the windshield, the windshield is provided to reflect the image light to the position of an eye box of the driver.

The above reflector is a curved mirror, to compensate for the influence of the freeform surface of the windshield.

The above reflector is a concave mirror, which is provided to reflect and enlarge images.

The windshield, a reflective film with translucent semi-reflective effect is set on it.

Another embodiment of the naked eye 3D head-up display device with reflective diffuser sheet of the present invention includes:

a projection module, which is provided to project an image light;

a reflective diffuser sheet, an array of micro-mirrors is set on it, the image light is projected to the reflective diffuser sheet;

a photography module, which is provided to face the driver's head area, the photography module is connected to the projection module;

the feature is that micro-mirror groups respectively corresponding to at least three diffusion areas are set on the array of micro-mirrors, the photography module is provided to perform optical eye tracking technology to know the current position of the driver's eyes and the papillary distance; the image light is provided to project a parallax image formed by staggering an image light with left-eye pixels and an image light with right eye pixels, according to the diffusion area corresponded by the position of pupils of two eyes, the projection module is provided to project images to the corresponding diffusion area, so that two eyes can separately receive images with different parallax, to generate a 3D stereoscopic image.

The array of micro-mirrors is provided with at least a first diffusion area, a second diffusion area and a third diffusion area.

The array of micro-mirrors is provided with at least a first vertical diffusion area.

Each micro-mirror is a concave mirror, a convex mirror or a plan mirror.

The reflective diffuser sheet, a plane or a curved surface is set on it, the array of micro-mirrors is set on the plane or the curved surface.

In the naked eye 3D head-up display device with reflective diffuser sheet of the present invention, the projection module is provided to project an image light, since the images projected on the left-eye and right-eye micro-mirrors of the reflective diffuser sheet are staggered and optical eye tracking technology is used to let the image light with left-eye pixels aim at the left-eye micro-mirror group on the reflective diffuser sheet and let the image light with right-eye pixels aim at the right-eye micro-mirror group on the reflective diffuser sheet, so that two eyes can separately receive images with different parallax, to provide a better 3D stereoscopic image, to effectively solve the problem that 3D images may be interrupted if the driver moves his head, to thereby improve driving safety.

DETAILED DESCRIPTION OF THE INVENTION

Please refer to FIG. 3 to FIG. 10, the first embodiment of the naked eye 3D head-up display device of the present invention includes:

a projection module 5, which is provided to project an image light L;

a reflective diffuser sheet 6, a plane is set on it, an array of micro-mirrors 61 is set on the plane, the image light L is projected to the reflective diffuser sheet 6.

Figure 1:
FIG. 1 is a schematic diagram according to the cited reference JP3526157.
Figure 2:
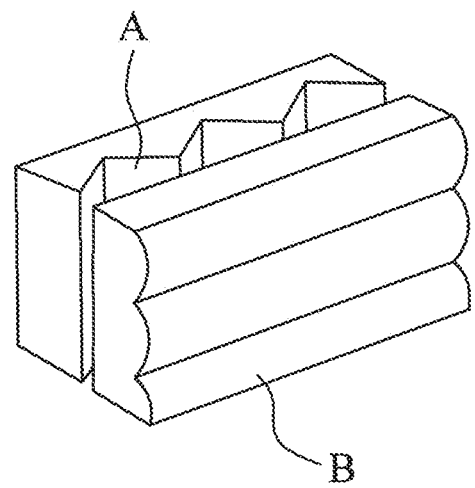
FIG. 2 is the other schematic diagram according to the cited reference JP3526157.
Figure 3:
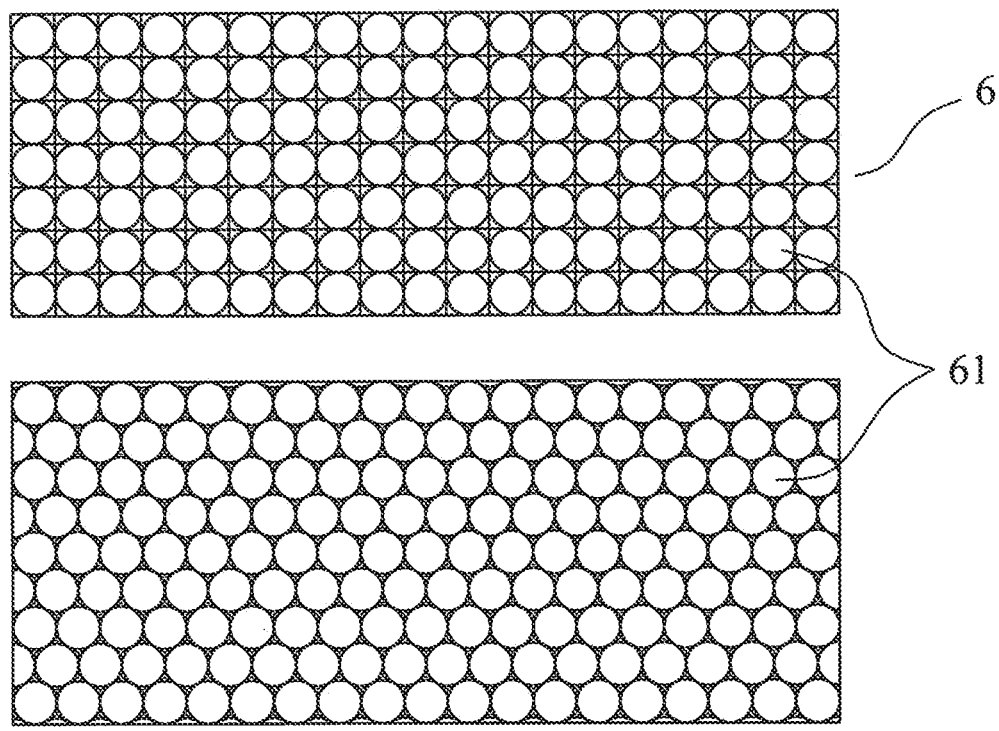
FIG. 3 is an enlarged diagram of the structure of the array the micro-mirrors according the present invention.

As shown in FIG. 3, the reflective diffuser sheet 6 is an square array or a hexagonal honeycomb array arranged by multiple micro-mirrors 61.

Figure 4:
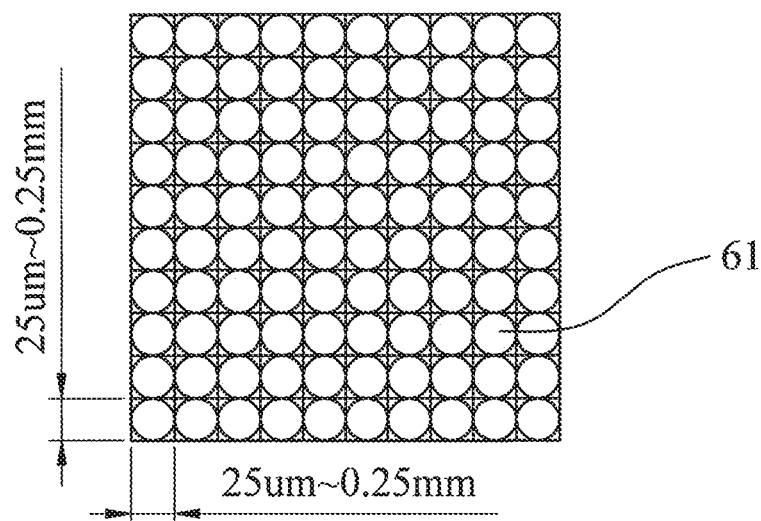
FIG. 4 is a schematic diagram of size of the micro-mirrors according to the present invention.

As shown in FIG. 4, size of each micro-mirror 61 may be 25 um to 0.25 mm according to the embodiment, but it is not limited to this range.

Figure 5:
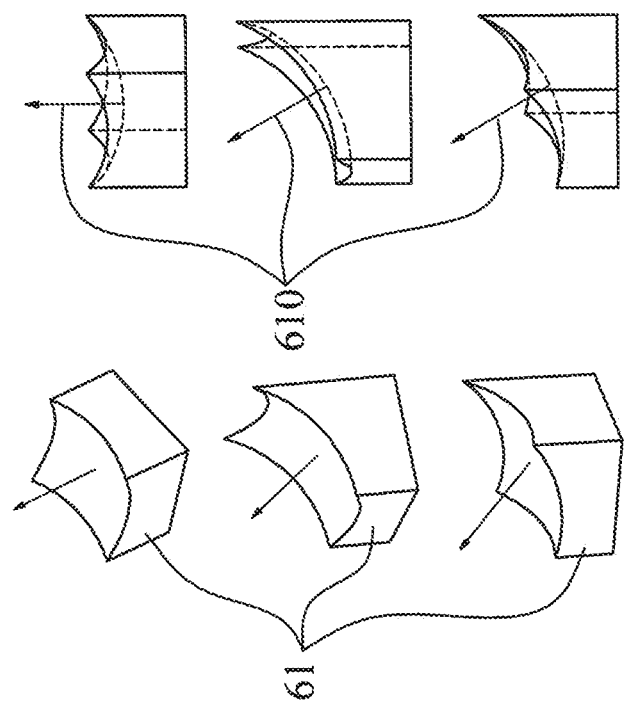
FIG. 5 is an enlarged diagram of the micro-mirrors according to the present invention.
Figure 5:
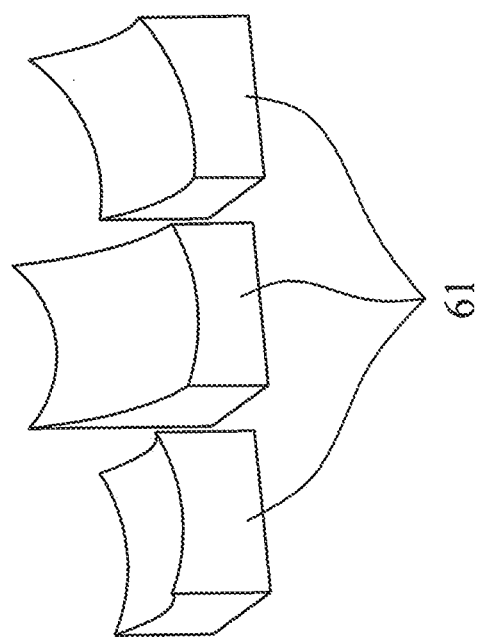

Each micro-mirror 61 could be a concave mirror, a convex mirror or a plane mirror, as shown in FIG. 5, which is an enlarged diagram of the micro-mirrors 61. The reflection angle 610 of each mirror 61 can be oriented in any direction according to design needs, so that the directivity of the reflective diffuser sheet 6 is free.

Figure 6:
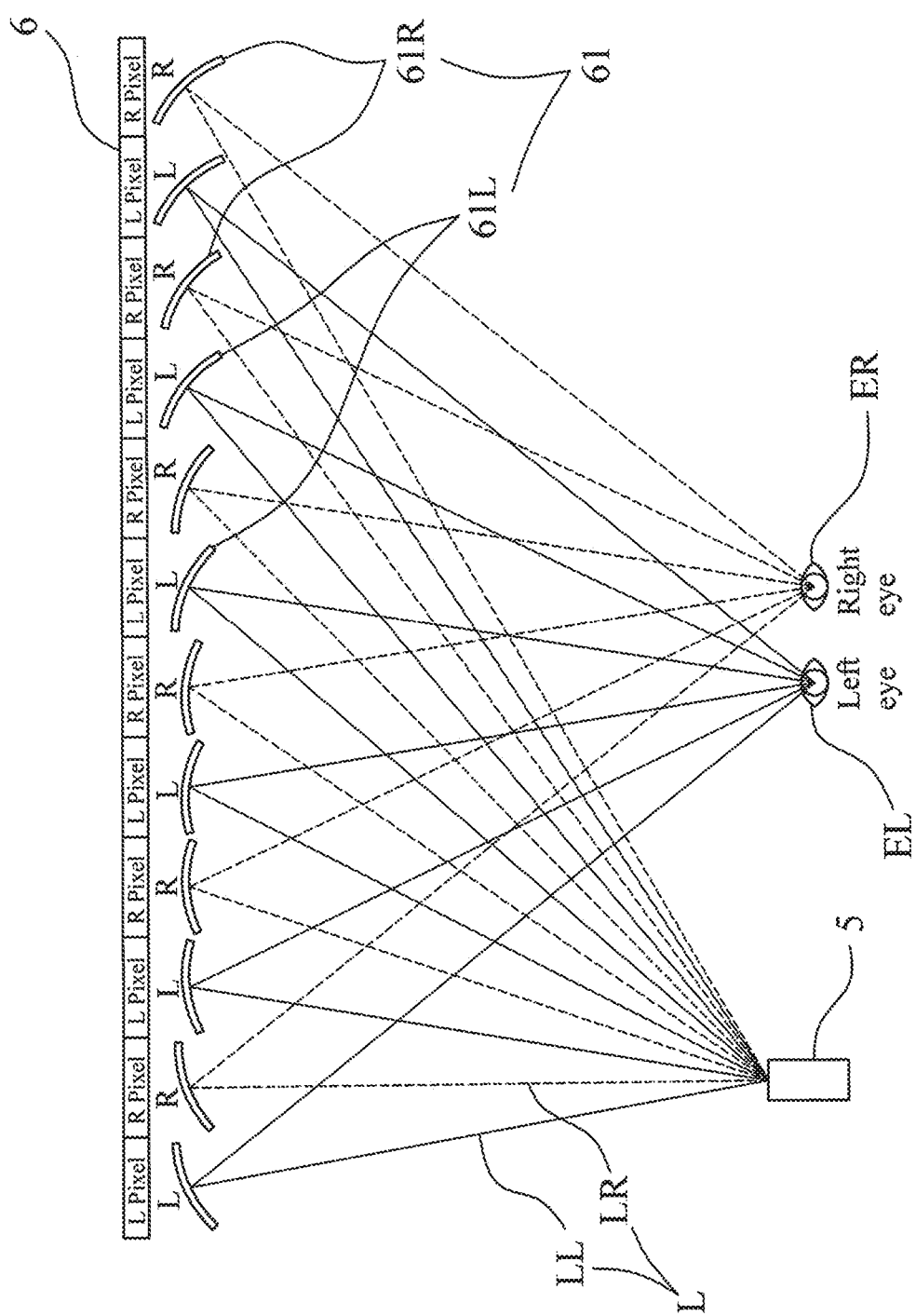
FIG. 6 is an implementation diagram 1 of the first embodiment of the present invention.

As shown in FIG. 6, the feature of the present invention is that the array of micro-mirrors 61 is divided into a left-eye micro-mirror group 61L (shown as L in figure) and a right-eye micro-mirror group 61R (shown as R in figure), the left-eye micro-mirror group 61L and the right-eye micro-mirror group 61R are staggered corresponding to the left eye EL and the right eye ER of the user on the reflective diffuser sheet 6, the image light L is provided to project a parallax image formed by staggering an image light with left-eye pixels LL and an image light with right eye pixels LR, the pixels of the image light LL with left pixels are provided to aim at the left-eye micro-mirror group 61L, the pixels of the image light LR with right pixels are provided to aim at the right-eye micro-mirror group 61R, so that the left eye EL and the right eye ER can separately receive image with different parallax, to generate a 3D stereoscopic image.

Figure 7:
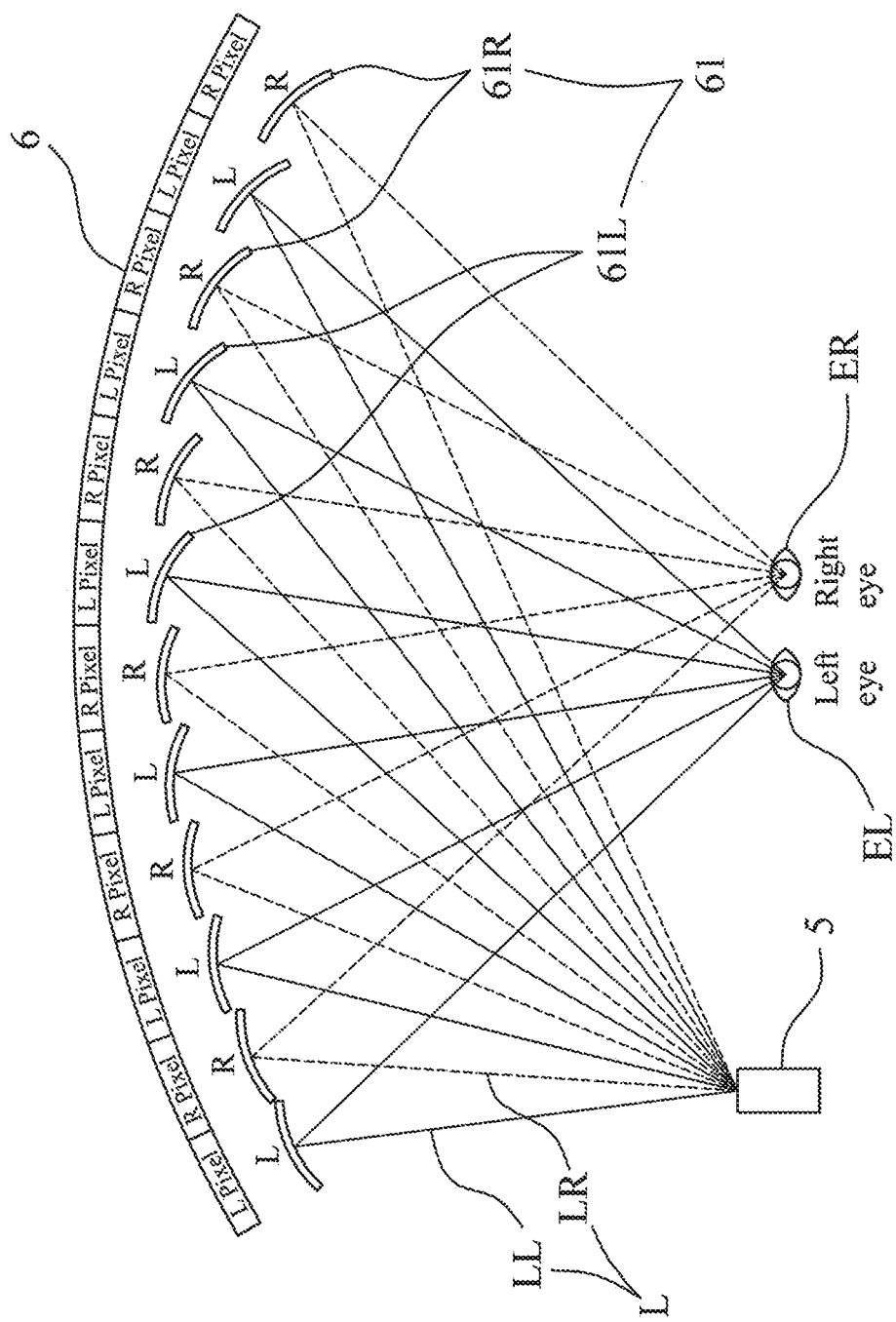
FIG. 7 an implementation diagram 2 of the first embodiment of the present invention.

As shown in FIG. 7, the reflective diffuser sheet 6 could be a curved surface, and the array of micro-mirrors 61 is set on the curved surface.

Figure 8:
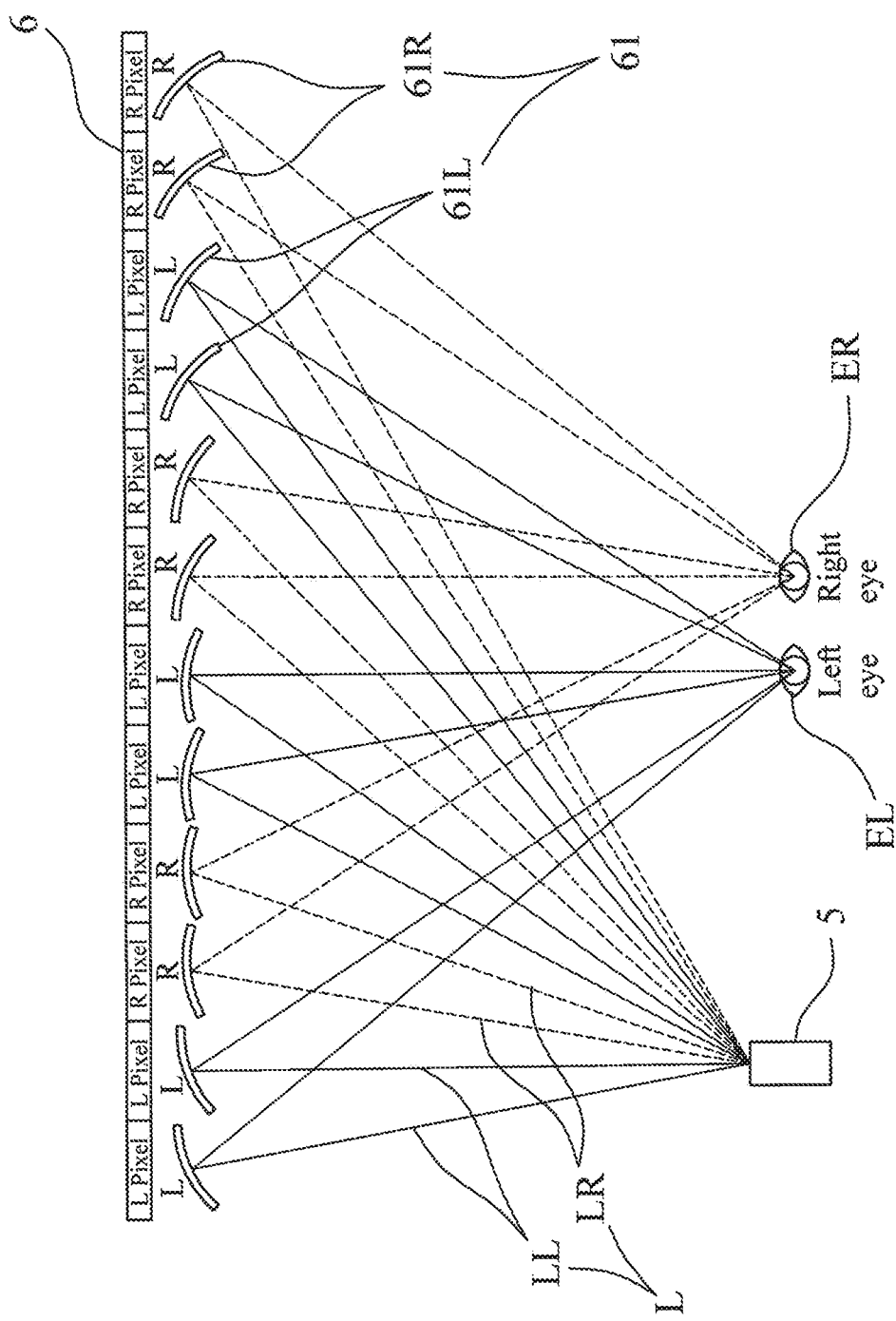
FIG. 8 is an implementation diagram 3 of the first embodiment of the present invention.

As shown in FIG. 8, wherein the arrangement of the left-eye micro-mirror group 61L (shown as L in figure) and the arrangement of the right-eye micro-mirror group 61R (shown as R in figure) are arranged in every two rows on the reflective diffuser sheet 6.

Figure 9:
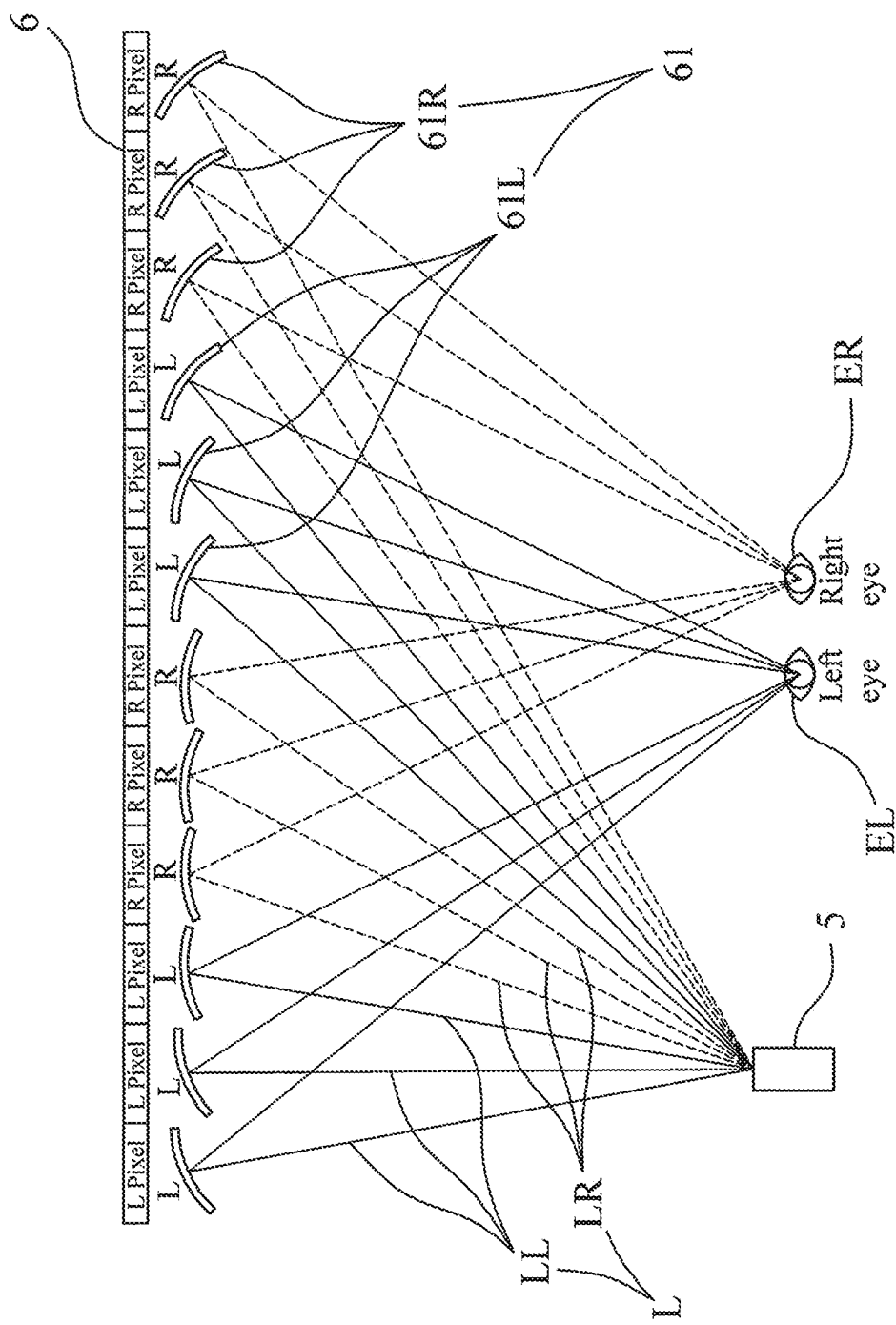
FIG. 9 is an implementation diagram 4 of the first embodiment of the present invention.

As shown in FIG. 9, wherein the arrangement of the left-eye micro-mirror group 61L (shown as L in figure) and the arrangement of the right-eye micro-mirror group 61R (shown as R in figure) are arranged in every multiple rows on the reflective diffuser sheet 6.

Figure 10:
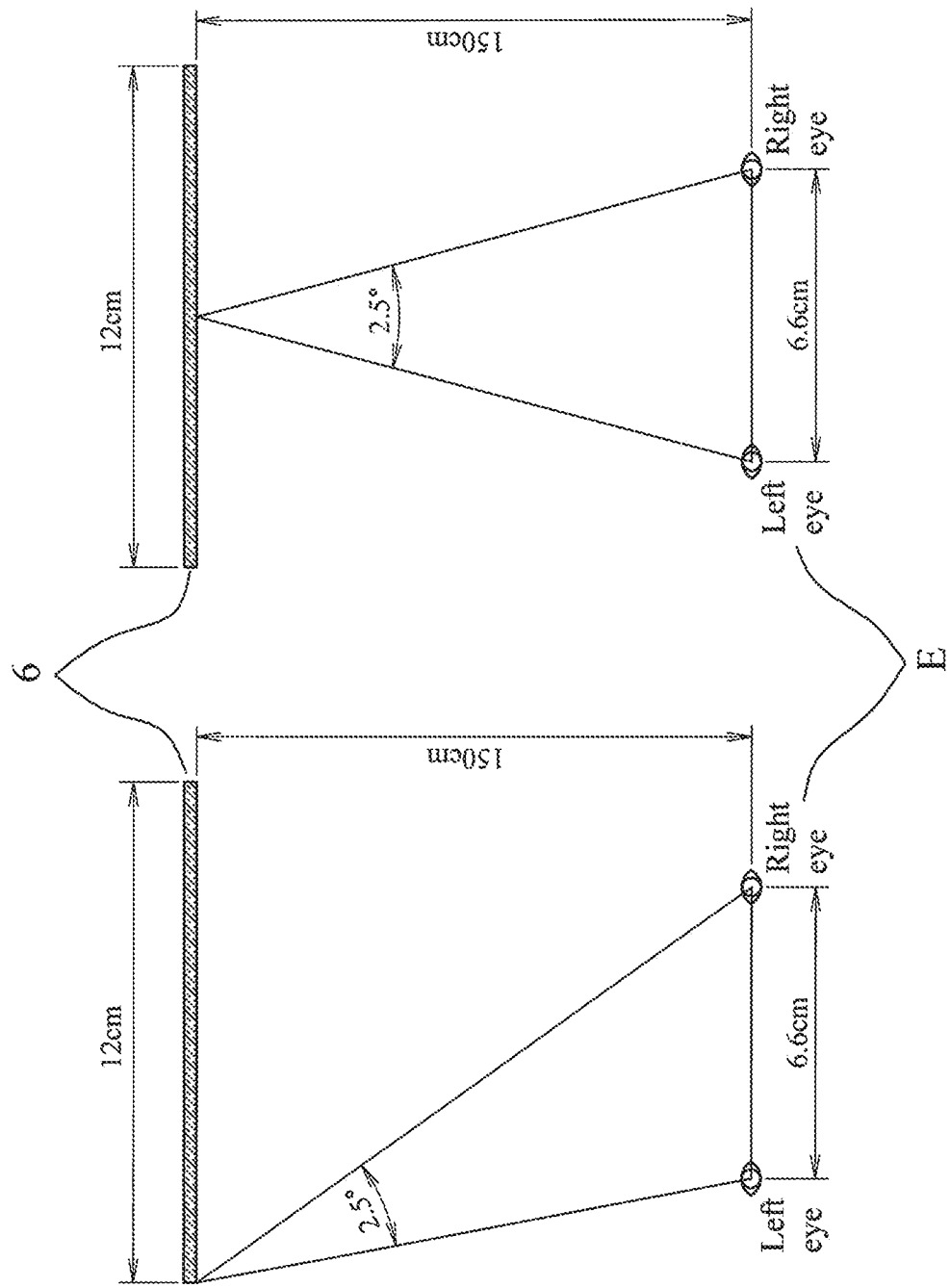
FIG. 10 is a schematic diagram of the projection angle of the first embodiment of the present invention.

As shown in FIG. 10, the distance of pupils of a general adult is about 6.3 cm~7 cm. Let's take the average value of 6.6 cm as an example, if the width of the reflective diffuser sheet 6 is 12 cm and the optical path distance from the reflective diffuser sheet 6 to driver's eyes E is about 150 cm, the deflection angle of the micro-mirrors 61 can be calculated, or the difference of deflection angles of adjacent micro-mirrors 61 can be calculated. Each micro-mirror 61 on the reflective diffuser sheet 6 can be a concave mirror, and also can be a convex mirror or a plane mirror.

Figure 11:
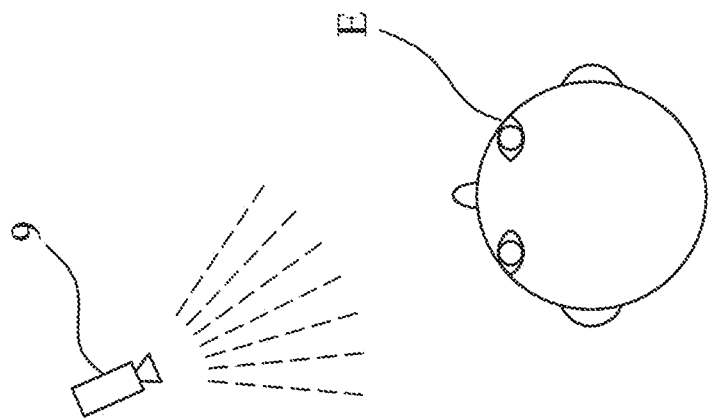
FIG. 11 is a schematic diagram of the second embodiment of the present invention.
Figure 11:
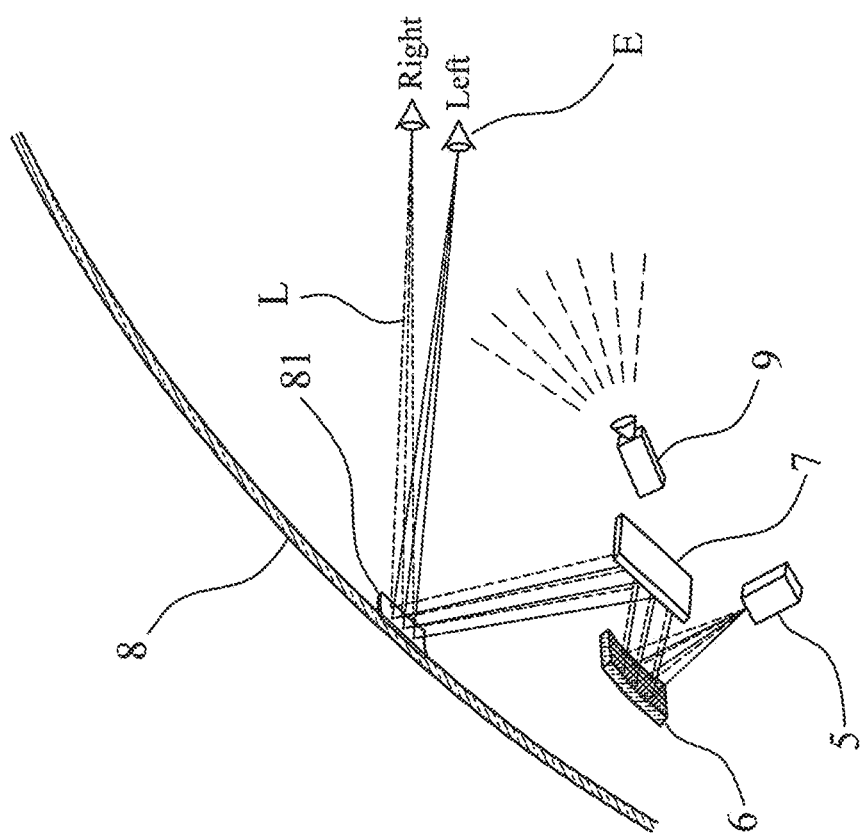
Figure 12:
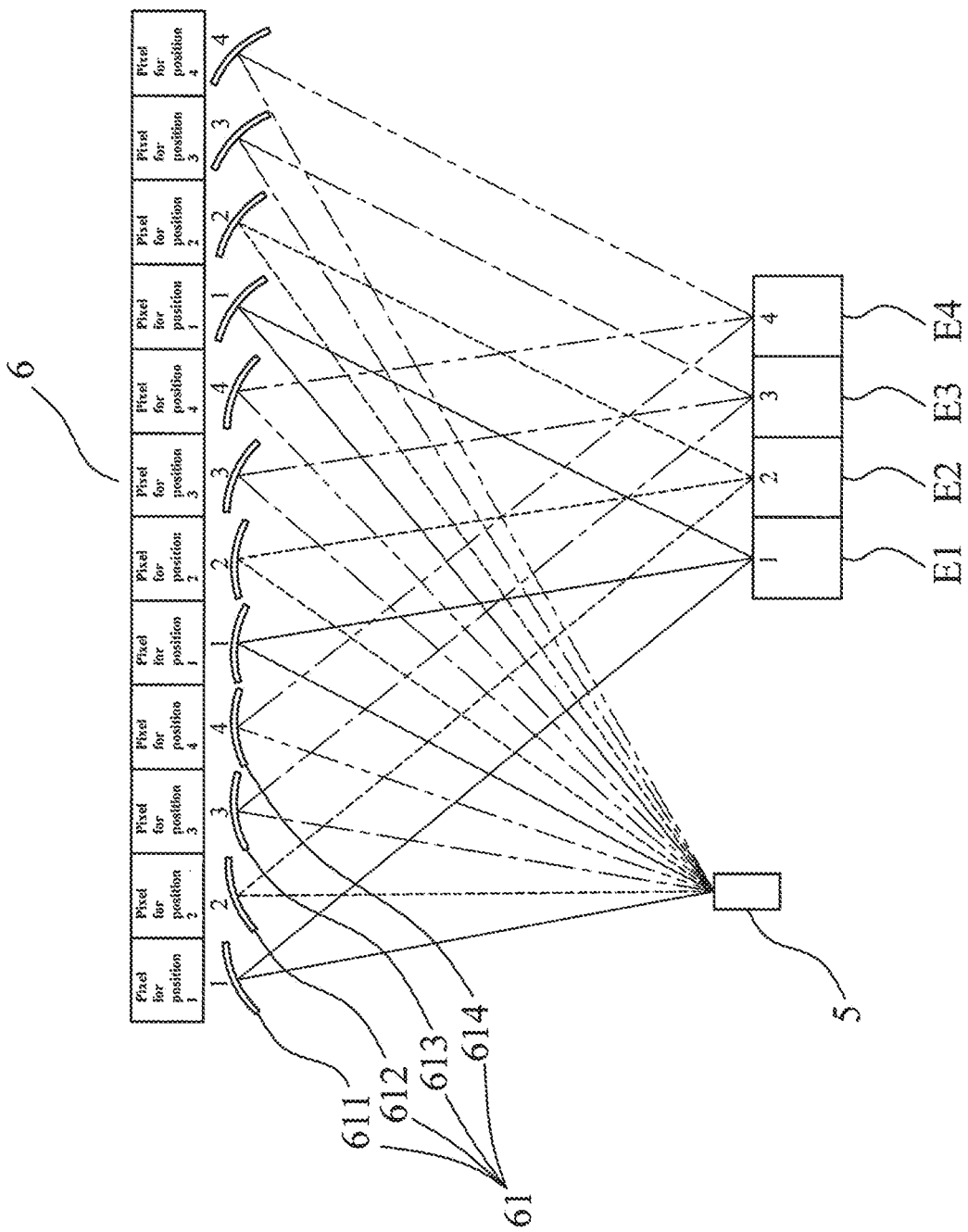
FIG. 12 is an implementation diagram 1 of the second embodiment of the present invention.

A shown in FIG. 11 to FIG. 22, the second embodiment of the naked eye 3D head-up display device of the present invention includes:

a projection module 5, which is provided to project an image light L;

a reflective diffuser sheet 6, an array of micro-mirrors 61 is set on it, the image light L is projected to the reflective diffuser sheet 6 (as shown in FIG. 12), the array of micro-mirrors 61 is set on the reflective diffuser sheet 6, the array of micro-mirrors 61 can be divided into multiple micro-mirror groups 611, 612, 613, 614 in different position, each of the micro-mirror groups 611, 612, 613, 614 corresponds to a diffusion area in different positions (namely a first diffusion area E1, a second diffusion area E2, a third diffusion area E3 and a fourth diffusion area E4, in order to illustrate the correspondence between diffusion areas and micro-mirror groups, in FIG. 12, numbers 1, 2, 3, 4 are respectively added near the micro-mirror groups 611, 612, 613, 614 for representation, and number 1, 2, 3, 4 are also respectively added near the first diffusion area E1, the second diffusion area E2, the third diffusion area E3 and the fourth diffusion area E4 correspondingly, the correspondence is represented by the same number);

a photography module 9, which is provided to face the driver's (namely, user's) head area (as shown in FIG. 11), the photography module 9 is connected to the projection module 5;

the feature of the present invention is that the micro-mirror groups respectively corresponding to at least three diffusion areas are set on the array of the micro-mirror 61, which are the micro-mirror group 611 corresponding to the first diffusion area E1, the micro-mirror group 612 corresponding to the second diffusion area E2 and the micro-mirror group 613 corresponding to the third diffusion area E3, the photography module 9 is provided to perform optical eye tracking technology to know the position of pupils of the two eyes (the left eye EL and the. right eye ER) of the driver and the papillary distance, the image light L is provided to project a parallax image with staggered image light with left-eye pixels LL and image light with right-eye pixels LR, according to the diffusion area corresponding to pupils of two eyes (it refers to correspond to the first diffusion area E1, the second diffusion area E2 and the third diffusion area E3), the projection module 5 project images to corresponding diffusion areas, so that two eyes can separately receive images with different parallax, to generate a 3D stereoscopic image.

As shown in FIG. 11, the naked eye 3D head-up display device with reflective diffuser sheet of the present invention further includes a reflector 7 and a windshield 8, the reflective diffuser sheet 6 is provided to reflect the image light L to the reflector 7, the reflector 7 is provided to reflect the image light to the windshield 8, the windshield 8 is provided to reflect the image light L to the position of the eye box of the driver's eye E (the eye box is the intersection range of the diffusion area of the reflective diffuser sheet 6, the projected images can be seen when an eye is in the range of the eye box).

The reflector 7 is a curved mirror, which is provided to compensate for the influence of the freeform surface of the windshield 8; the reflector 7 is a concave mirror, virtual images can be enlarged and virtual image distance can also be farther at the same ratio by using a concave mirror.

A reflective film 81 with translucent semi-reflective effect is set on the windshield to improve the reflectivity of the image light L.

The number of the micro-mirror groups set in the array of micro-mirrors is not limited to three, for example, if there are four diffusion areas in four different positions, there are four corresponding micro-mirror groups, wherein the micro-mirror group 611 corresponding to the first diffusion area E1, the micro-mirror group 612 corresponding to the second diffusion area E2, the micro-mirror group 613 corresponding to the third diffusion area E3 and the micro-mirror group 614 corresponding to the fourth diffusion area E4 are set in the array of micro-mirrors 61.

Figure 13:
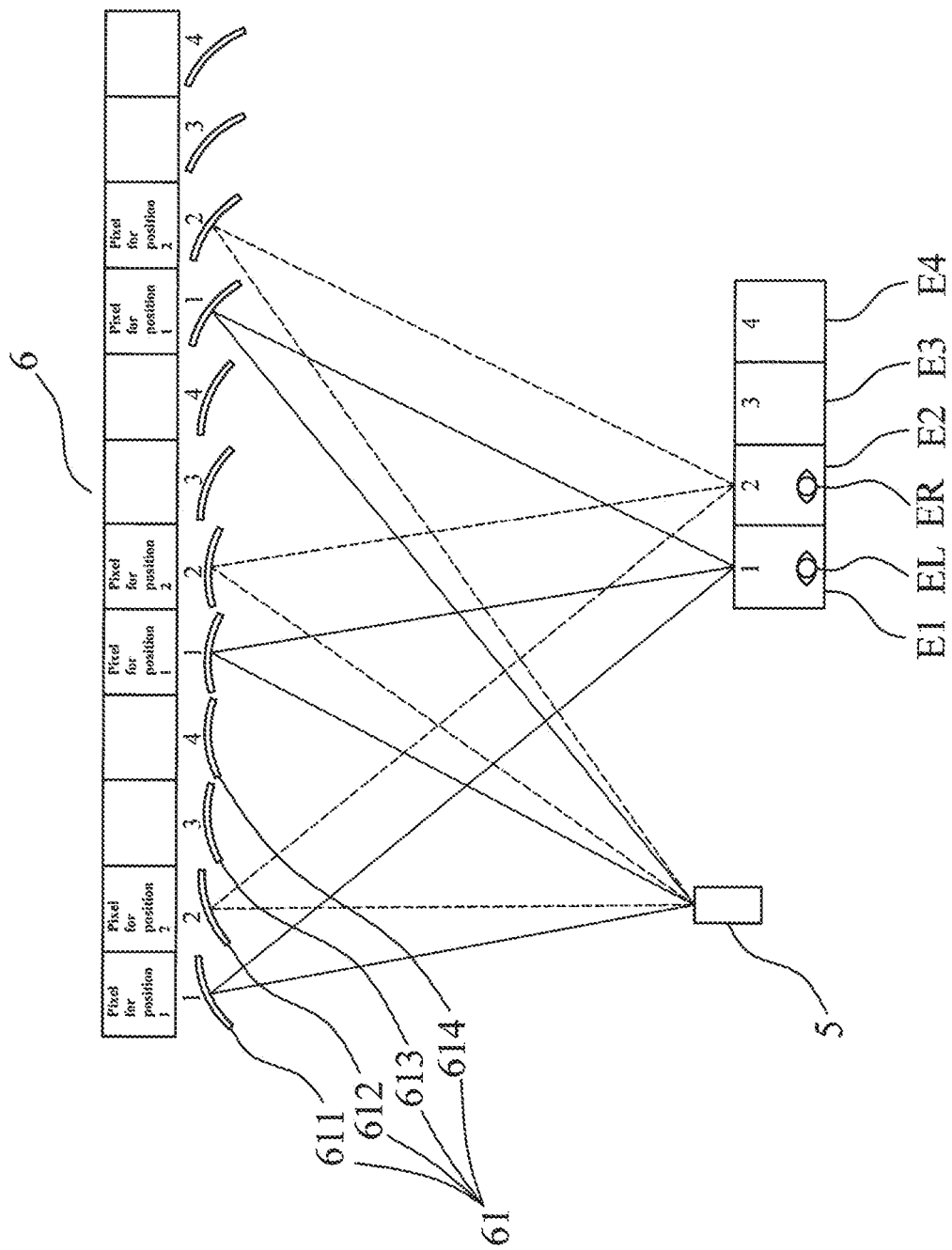
FIG. 13 is an implementation diagram 2 of the second embodiment of the present invention.

As shown in FIG. 13, if the positions of the pupils of the two eyes (the left eye EL and the right eye ER) of the user are respectively in the first diffusion area E1 and the second diffusion area E2, the projection module 5 projects the left image pixels LL for the array of the micro-mirror group 611 corresponding to the first diffusion area E1 and project the right image pixels LR for the array of the micro-mirror group 612 corresponding to the second diffusion area E2, so the user can see 3D images with naked eyes.

Figure 14:
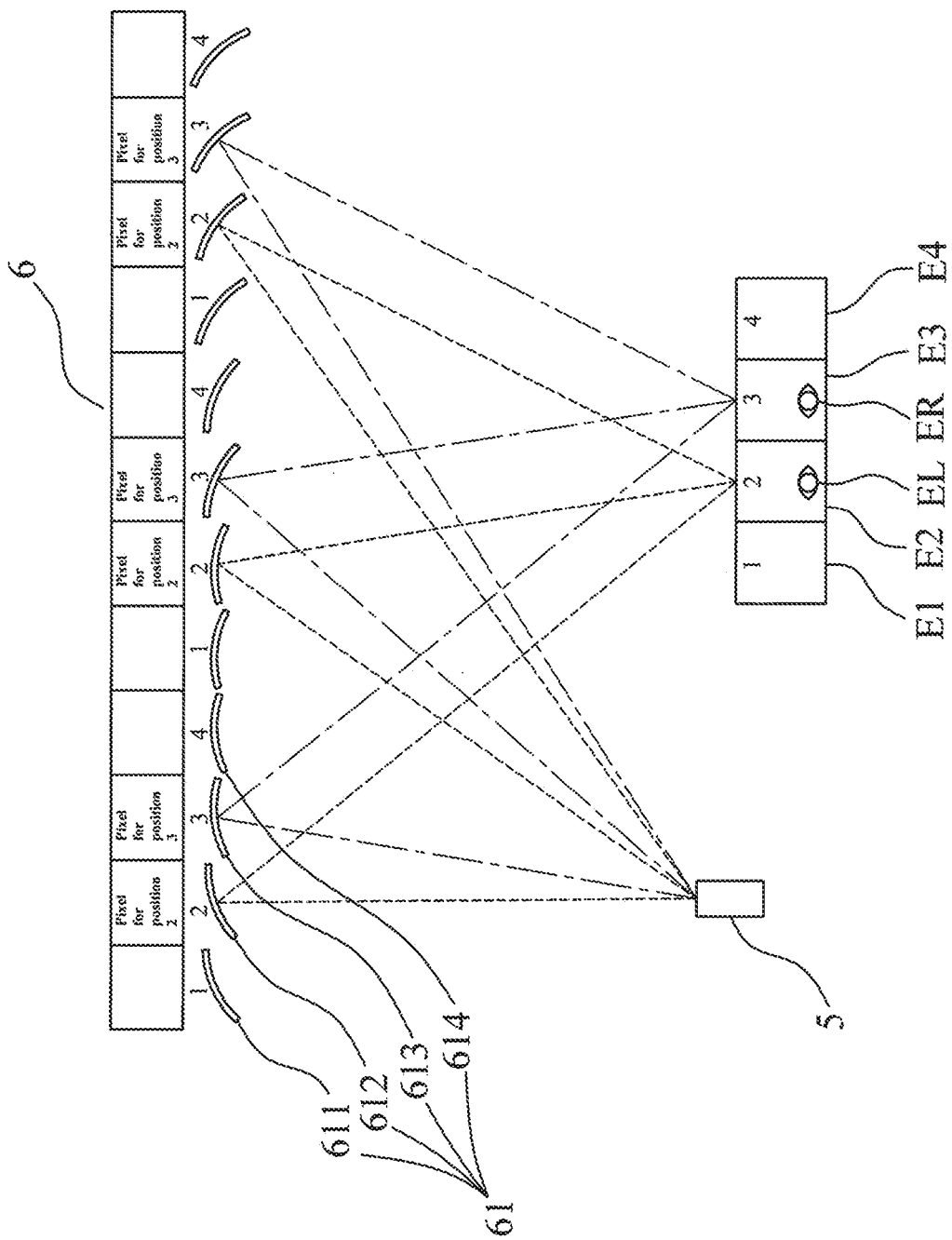
FIG. 14 is an implementation diagram 3 of the second embodiment of the present invention.

As shown in FIG. 14, if the driver moves his head to the right, the positions of the pupils of the two eyes (the left eye EL and the right eye ER) are respectively in the second diffusion area E2 and the third diffusion area E3, the projection module 5 projects the left image pixels LL for the array of the micro-mirror group 612 corresponding to the second diffusion area E2 and project the right image pixels LR for the array of the micro-mirror group 613 corresponding to the third diffusion area E3, so the user can see 3D images with naked eyes.

Figure 15:
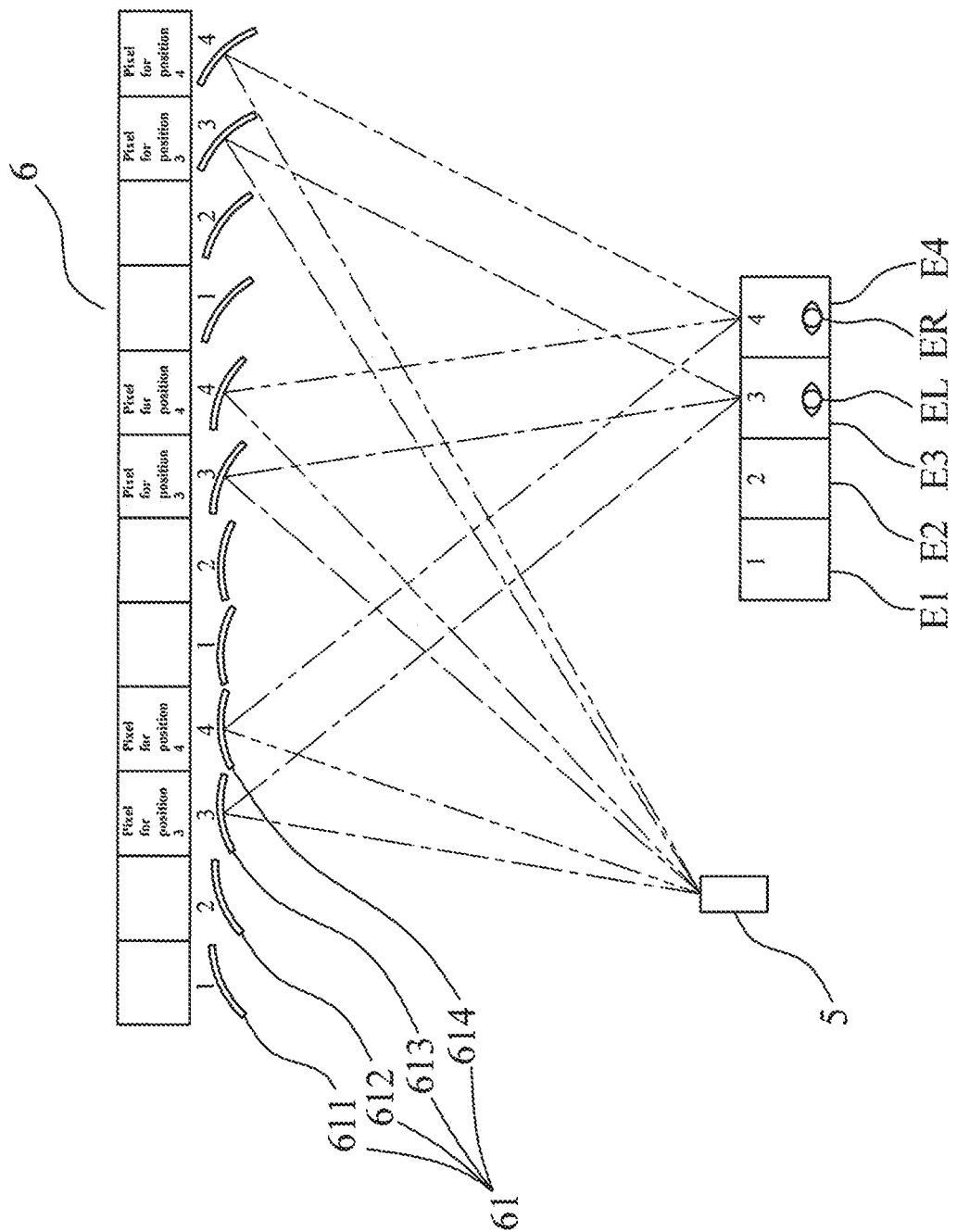
FIG. 15 is an implementation diagram 4 of the second embodiment of the present invention.

As shown in FIG. 15, and so on, if the positions of the pupils of the two eyes (the left eye EL and the right eye ER) of the driver moves to the third diffusion area E3 and the fourth diffusion area E4, the projection module 5 projects the left image pixels LL for the array of the micro-mirror group 613 corresponding to the third diffusion area E3 and project the right image pixels LR for the array of the micro-mirror group 614 corresponding to the fourth diffusion area E4, so the user still can see 3D images without interruption.

Figure 16:
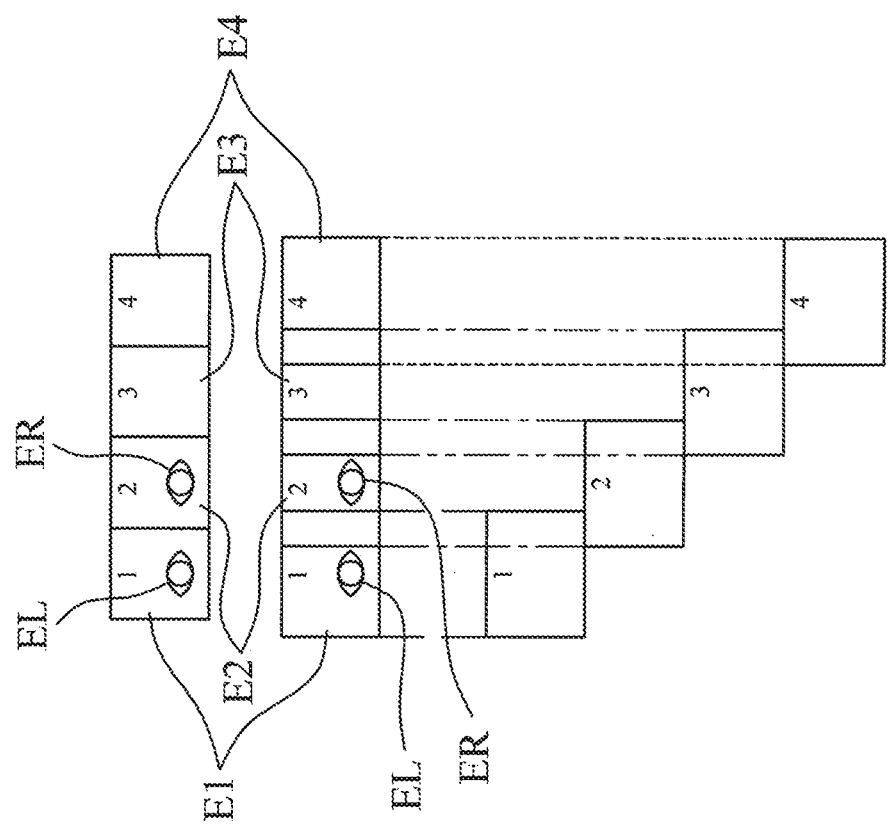
FIG. 16 is a schematic diagram 1 of the horizontal diffusion areas of the second embodiment of the present invention.

As shown in FIG. 16, since everyone's pupillary distance is not the same, in order to avoid the problem that 3D images will be invalid when the user moves the head horizontally, different diffusion areas may be overlapped partially, the width of the overlapping area is smaller than the smallest pupillary distance of human eyes, and the width of non-overlapping area is also smaller than the smallest pupillary distance of human eyes.

Figure 17:
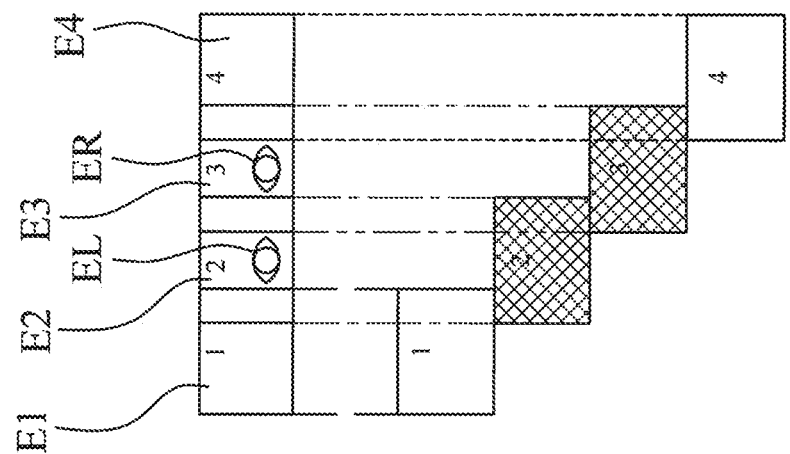
FIG. 17 is a schematic diagram 2 of the horizontal diffusion areas of the second embodiment of the present invention.
Figure 17:
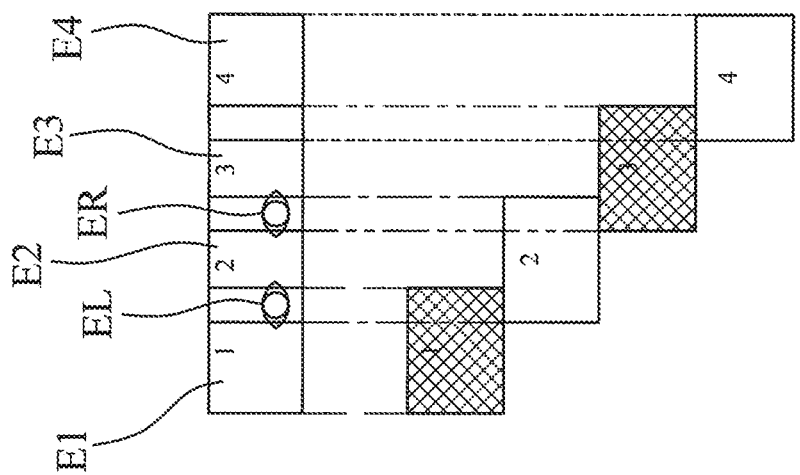
Figure 17:
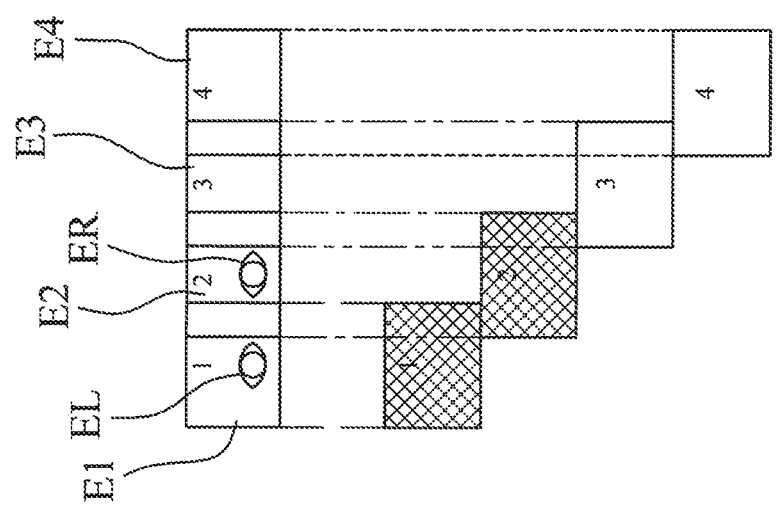

As shown in FIG. 17, if the papillary distance of the driver is smaller than the width of each diffusion area, when the driver moves his head horizontally, moves from left to right or from right to left, taking moving from left to right as example here, wherein the first diffusion area E1, the second diffusion area E2, the third diffusion area E3 and the fourth diffusion area E4 are diffusion area in horizontal direction. At the first timing (please refer to the left figure in FIG. 17, number 1, 2, 3, 4 indicate the correspondence), the position of pupils of the left eye EL and the right eye ER are respectively in the first diffusion area E1 and the second diffusion area E2, but the first diffusion area E1 and the second diffusion area E2 are partially overlapped, the projection module 5 projects the image light with left pixels LL for the array of the micro-mirror group 611 corresponding to the first diffusion area E1 and projects the image light with right pixels LR for the array of the micro-mirror group 612 corresponding to the second diffusion area E2, the driver can see 3D images normally.

And then at the next timing (please refer to the middle figure in FIG. 17), the position of pupil of the left eye EL is in the overlapping area of the first diffusion area E1 and the second diffusion area E2, the position of pupil of the right eye ER is in the overlapping area of the second diffusion area E2 and the third diffusion area E3. The projection module 5 projects the image light with left pixels LL for the array of the micro-mirror group 611 corresponding to the first diffusion area E1, it does not project images for the array of the micro-mirror group 612 corresponding to the second diffusion area E2, but projects the image light with right pixels LR for the array of the micro-mirror group 613 corresponding to the third diffusion area E3, so the driver still can see 3D images normally.

And the next timing ((please refer to the right figure in FIG. 17), the left eye EL is still in the second diffusion area E2, and the right eye ER is in the third diffusion area E3; the projection module 5 does not project images for the array of the micro-mirror group 611 corresponding to the first diffusion area E1, it projects the image light with left-eye pixels LL for the array of the micro-mirror group 612 corresponding to the second diffusion area E2, and projects the image light with right-eye pixels LR for the array of the micro-mirror group 613 corresponding to the third diffusion area E3, so the driver still can see 3D images normally.

From the diffusion areas in horizontal direction in FIG. 17, it can be known that 3D images will not be interrupted if the driver moves his head horizontally.

Figure 18:
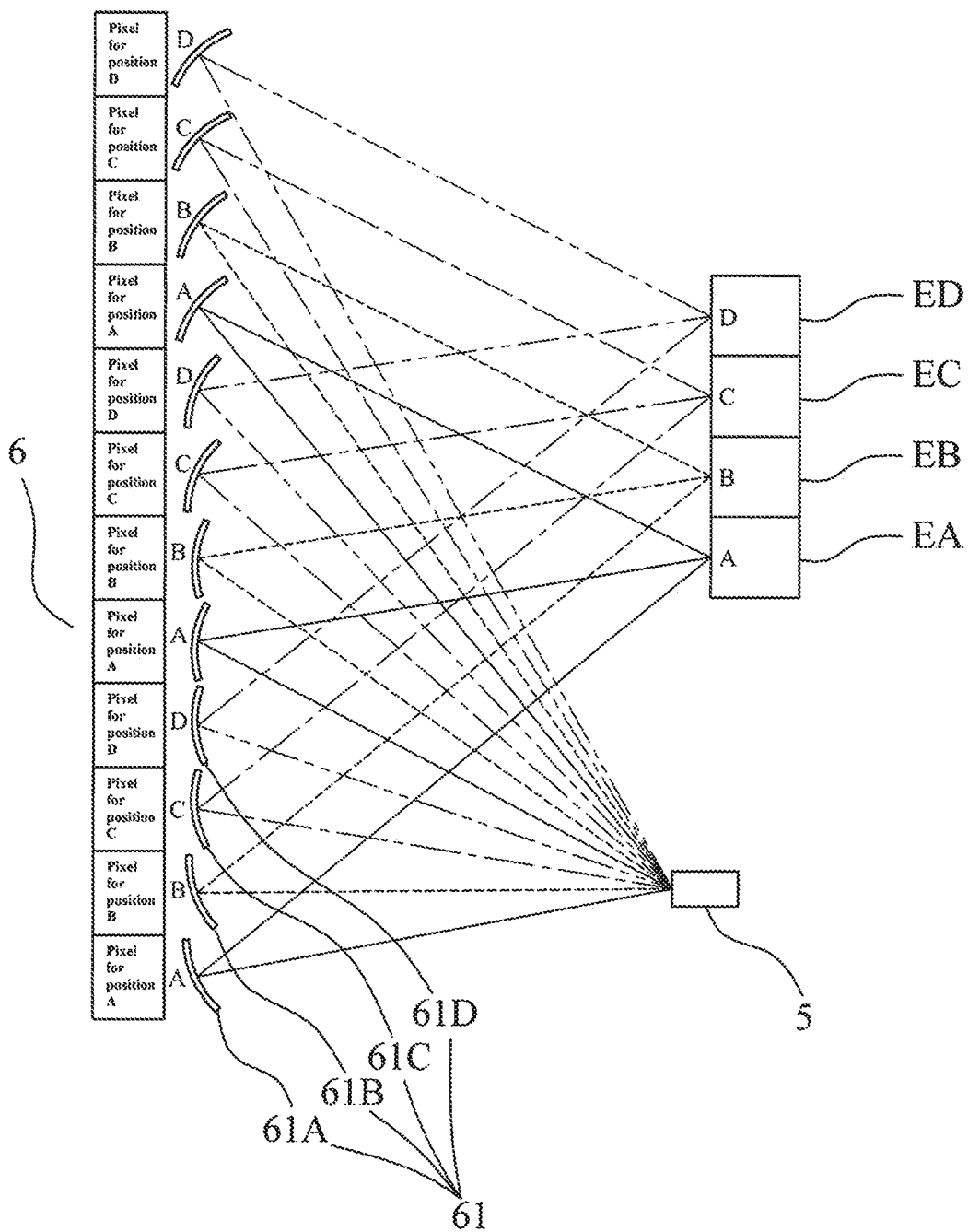
FIG. 18 is a schematic diagram 1 of the vertical diffusion areas of the second embodiment of the present invention.
Figure 19:
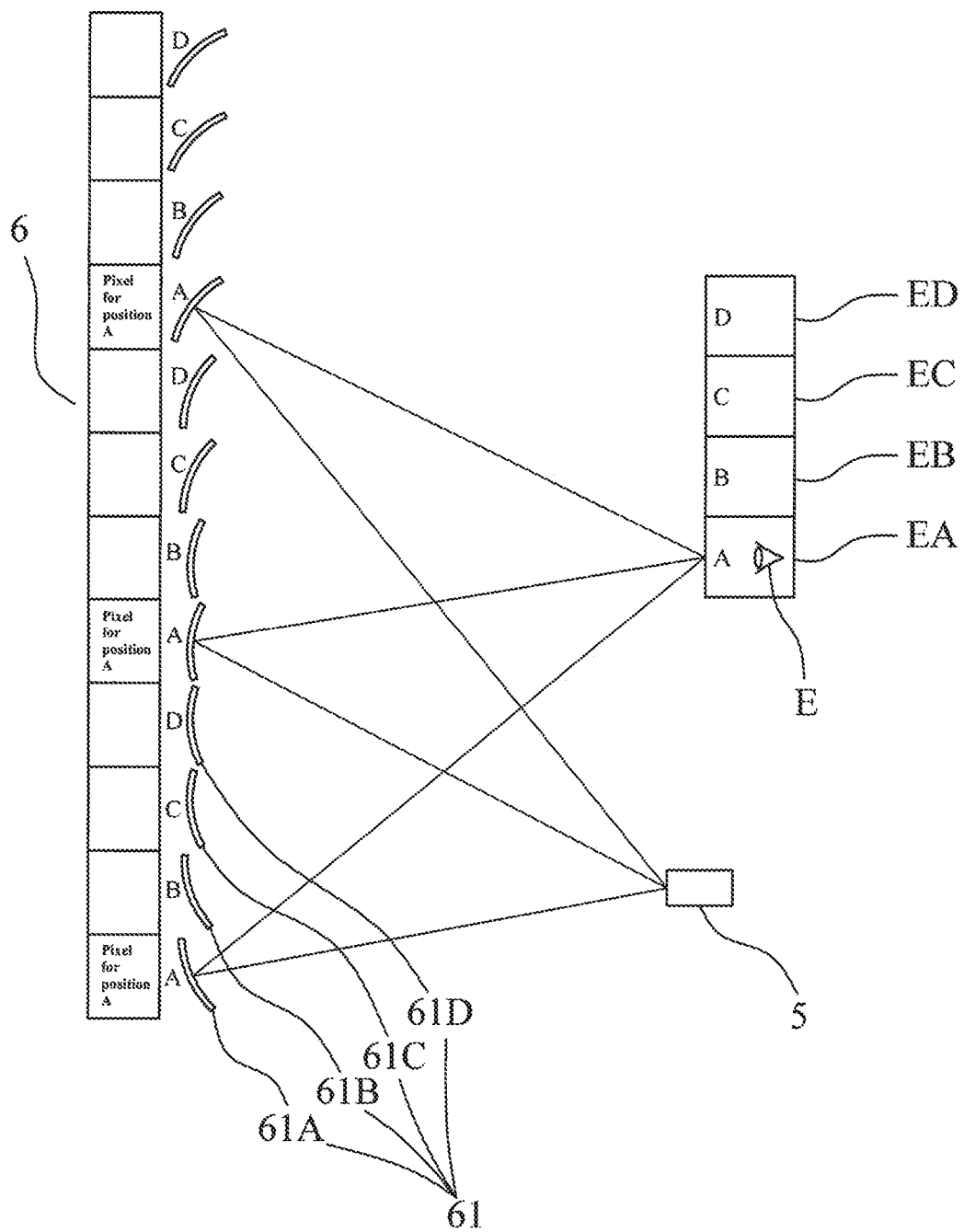
FIG. 19 is a schematic diagram 2 of the vertical diffusion areas of the second embodiment of the present invention.
Figure 20:
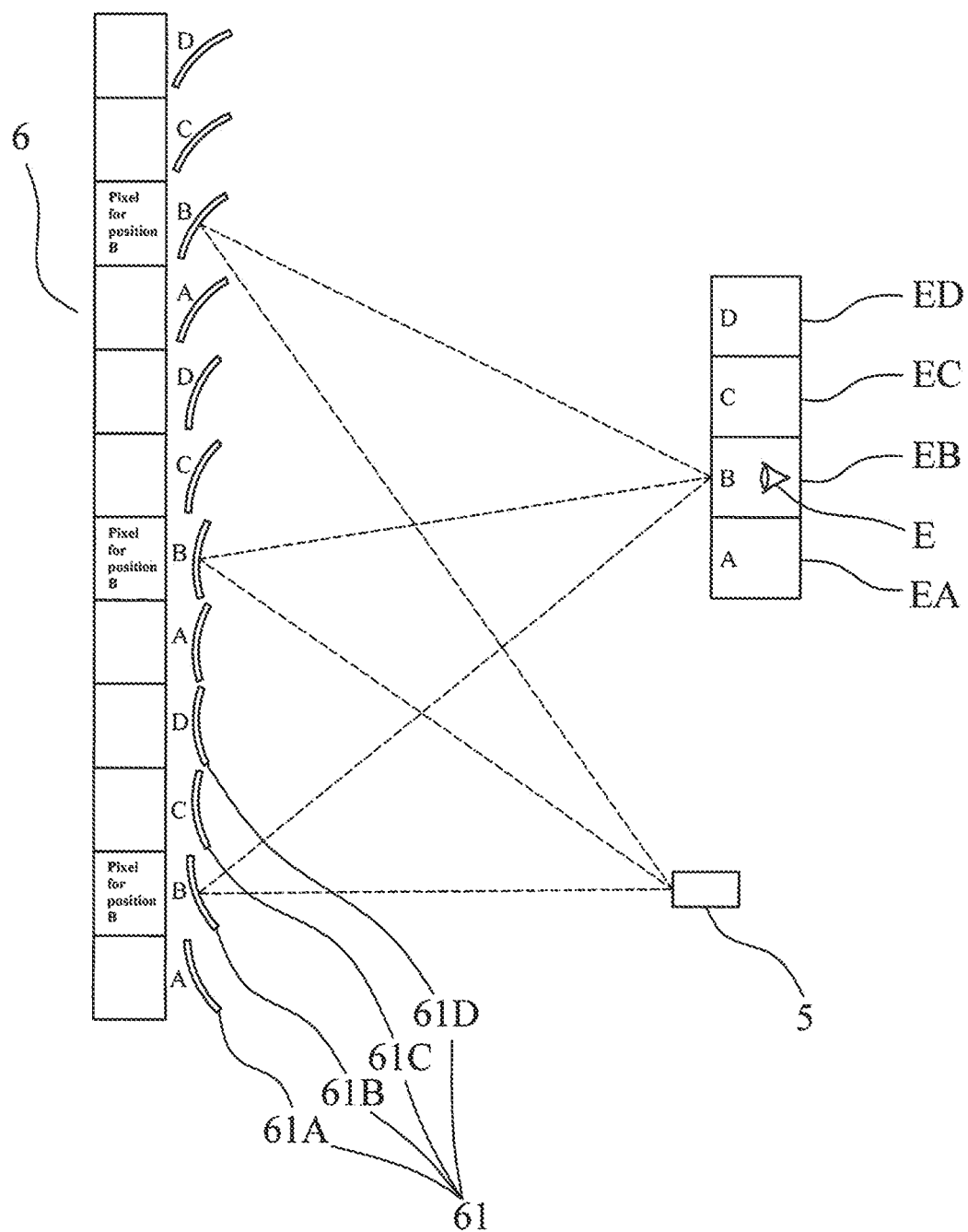
FIG. 20 is a schematic diagram 3 of the vertical diffusion areas of the second embodiment of the present invention.

As shown in FIG. 18, since the height of drivers are not the same, and a driver may also move his head up and down during driving, in order to avoid the problem that 3D images will be interrupted when the driver moves the head, similar to the distribution of the diffusion areas in horizontal direction, different diffusion areas can also be distributed in vertical direction, for example, there are four diffusion areas vertically and four corresponding micro-mirror groups, in order to illustrate the correspondence between diffusion areas and micro-mirror groups, in FIG. 18, letters A, B, C, D are respectively added near the micro-mirror groups 61A, 61B, 61C, 61D, and also added near the first vertical diffusion area EA, the second vertical diffusion area EB, the third vertical diffusion area EC and the fourth vertical diffusion area ED, the correspondence is represented by the same letter. As shown in FIG. 19, when the driver moves his head from low to high, at the first timing, the position of pupils of driver's eyes E is in the first vertical diffusion area EA, the projection module 5 projects the image light with left-eye pixels LL and the image light with right-eye pixels LR for the array of the micro-mirror group 61A corresponding to the first vertical diffusion area EA. As shown in FIG. 20, when the position of pupils of driver's eyes E moves to the second vertical diffusion area EB, the projection module 5 does not project images for the array of the micro-mirror group 61A corresponding to the first vertical diffusion area EA, it projects the image light with left-eye pixels LL and the image light with right-eye pixels LR for the array of the micro-mirror group 61B corresponding to the second vertical diffusion area EB.

Figure 21:
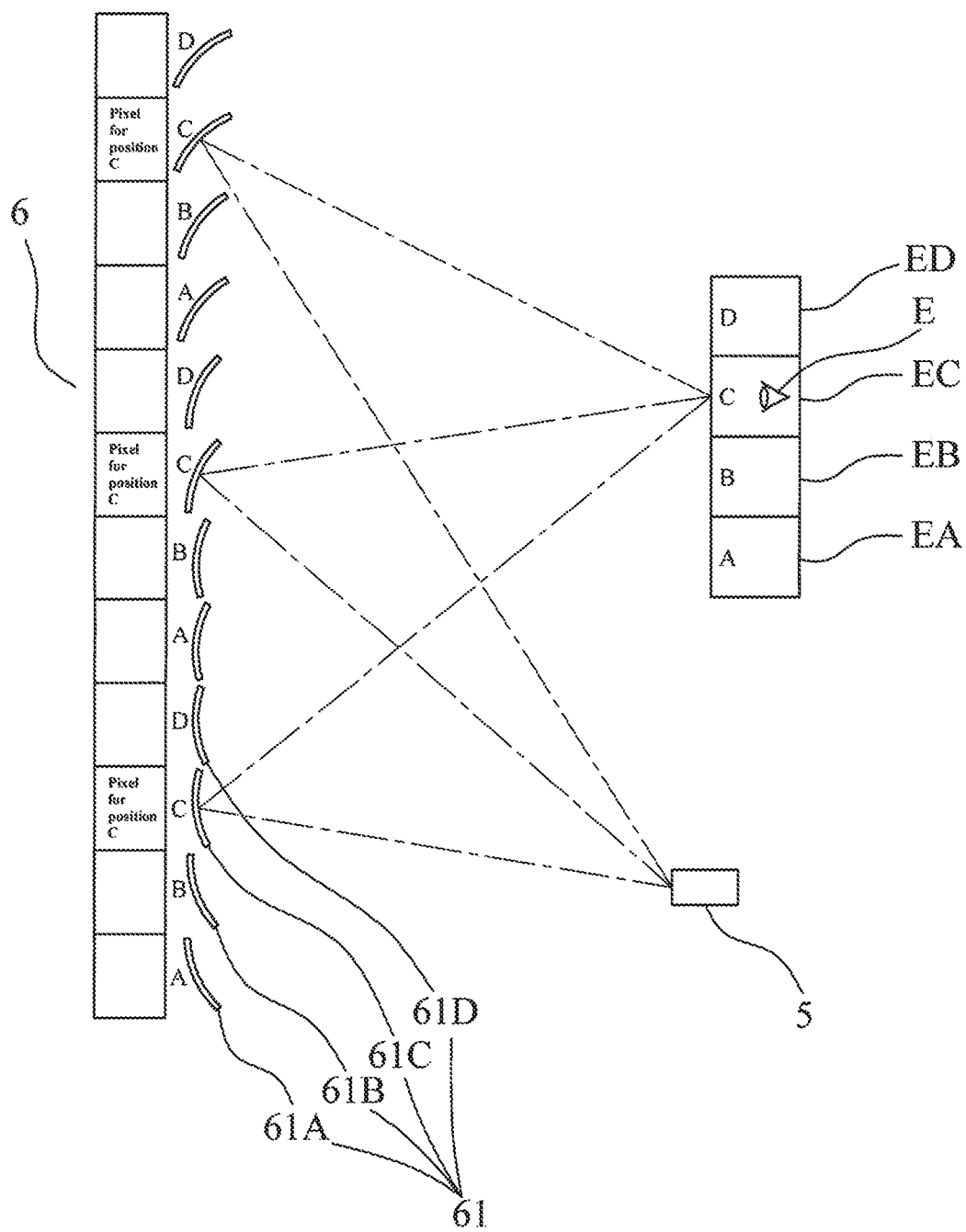
FIG. 21 is a schematic diagram 4 of the vertical diffusion areas of the second embodiment of the present invention.

As shown in FIG. 21, when the position of pupils of driver's eyes E move to the third vertical diffusion area EC, the projection module 5 does not project images for the array of the micro-mirror group 61B corresponding to the second vertical diffusion area EB, it projects the image light with left-eye pixels LL and the image light with right-eye pixels LR for the array of the micro-mirror group 61C corresponding to the third vertical diffusion area EC.

Figure 22:
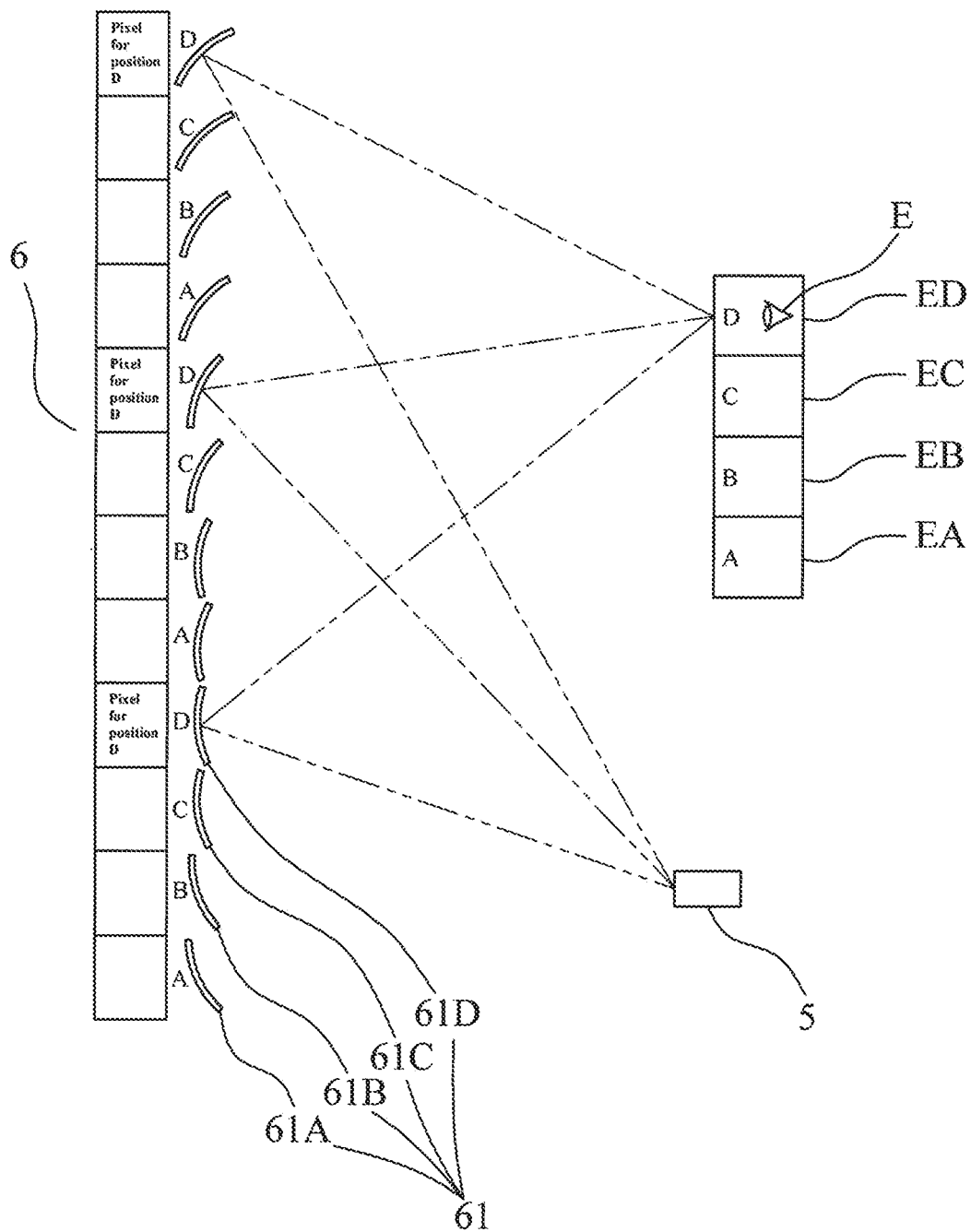
FIG. 22 is a schematic diagram 5 of the vertical diffusion areas of the second embodiment of the present invention.

As shown in FIG. 22, when the position of pupils of driver's eyes E move to the fourth vertical diffusion area ED, the projection module 5 does not project images for the array of the micro-mirror group 61C corresponding to the third vertical diffusion area EC, it projects the image light with left-eye pixels LL and the image light with right-eye pixels LR for the array of the micro-mirror group 61D corresponding to the fourth vertical diffusion area ED.

From the above description of the diffusion areas in vertical direction, it can be known that 3D images will not be interrupted if the driver moves his head vertically.

Figure 23:
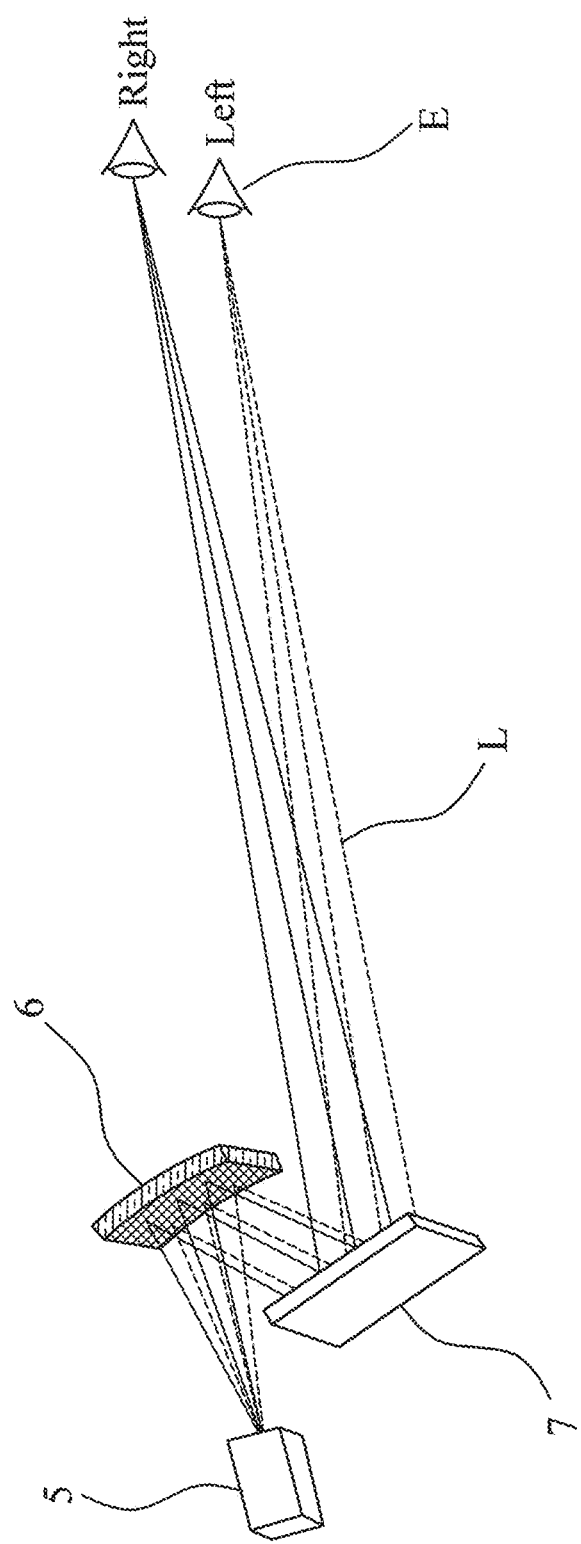
FIG. 23 is a schematic diagram of the third embodiment of the present invention.

As shown in FIG. 23, the third embodiment of the naked eye 3D head-up display device with reflective diffuser sheet of the present invention includes:

a projection module 5, which is provided to project an image light L;

a reflective diffuser sheet 6, the image light L is projected to the reflective diffuser sheet 6;

a reflector 7, the reflective diffuser sheet 6 is provided to reflect the image light L to the reflector 7, the reflector 7 is provided to reflect the image light L to the position of the eye box of the driver's eye E (the eye box is the intersection range of the diffusion area of the reflective diffuser sheet 6, the projected images can be seen when an eye is in the range of the eye box).

The reflector 7 is a concave mirror, a curved mirror or a plane mirror; the reflector 7 is a curved mirror, which is provided to compensate for the influence of the freeform surface of the windshield 8; the reflector 7 is a concave mirror, virtual images can be enlarged and virtual image distance can also be farther at the same ratio by using a concave mirror.

Figure 24:
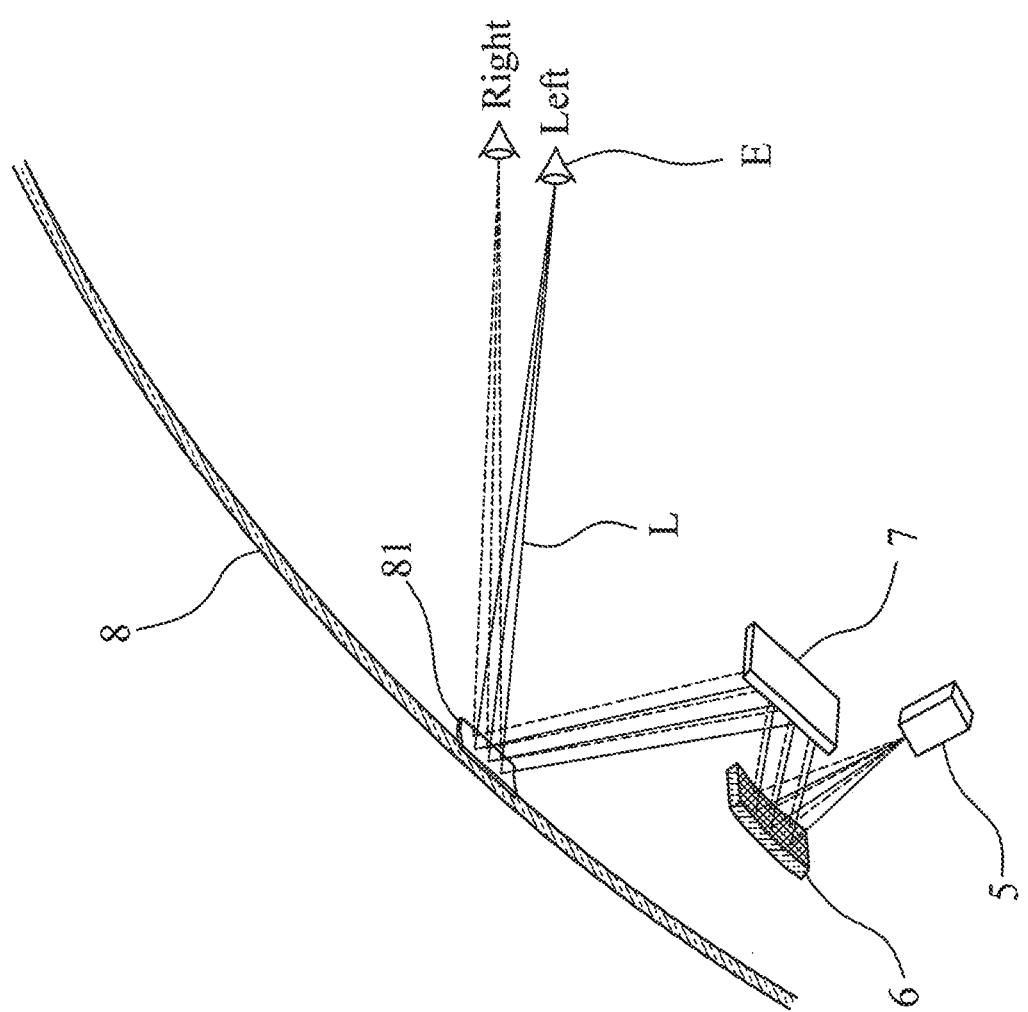
FIG. 24 is a schematic diagram of the fourth embodiment of the present invention.

As shown in FIG. 24, the fourth embodiment of the naked eye 3D head-up display device with reflective diffuser sheet of the present invention includes:

a projection module 5, which is provided to project an image light L;

a reflective diffuser sheet 6, the image light L is projected to the reflective diffuser sheet 6;

a reflector 7, the reflective diffuser sheet 6 is provided to reflect the image light L to the reflector 7;

a windshield 8, the reflector 7 is provided to reflect the image light to the windshield 8, the windshield 8 is provided to reflect the image light L to the position of the eye box of the driver's eye.

The reflector 7 is a concave mirror, a curved mirror or a plane mirror; the reflector 7 is a curved mirror, to compensate for the influence of the freeform surface of the windshield 8; the reflector 7 is a concave mirror, virtual images can be enlarged and virtual image distance can also be farther at the same ratio by using a concave mirror.

A reflective film 81 with translucent semi-reflective effect is set on the windshield to improve the reflectivity of the image light L.

The naked eye 3D head-up display device with reflective diffuser sheet of the present invention, wherein the projection module is provided to project an image light, since the images projected on the left-eye and right-eye micro-mirrors of the reflective diffuser sheet are staggered and optical eye tracking technology is used to let the image light with left-eye pixels aim at the left-eye micro-mirror group on the reflective diffuser sheet and let the image light with right-eye pixels aim at the right-eye micro-mirror group on the reflective diffuser sheet, so that two eyes can separately receive images with different parallax, to provide a better 3D stereoscopic image.

What is claimed is:

1. A naked eye 3D head-up display device with reflective diffuser sheet, comprising:
   a projection module, which is provided to project an image light;
   a reflective diffuser sheet, an array of micro-mirrors is set on it, the image light is projected to the reflective diffuser sheet;
   a photography module, which is provided to face a driver's head area, the photography module is connected to the projection module;
   a feature is that micro-mirror groups respectively corresponding to at least three diffusion areas are set on the array of micro-mirrors, the photography module is provided to perform optical eye tracking technology to know the current position of the driver's eyes and the papillary distance; the image light is provided to project a parallax image formed by staggering an image light with left-eye pixels and an image light with right eye pixels, according to the diffusion area corresponded by the position of pupils of two eyes, the projection module is provided to project images to the corresponding diffusion area, so that the two eyes can separately receive images with different parallax, to generate a 3D stereoscopic image;
   wherein the array of micro-mirrors is fixed on the reflective diffuser sheet and the adjacent diffusion areas is overlapped partially.

2. The naked eye 3D head-up display device with reflective diffuser sheet as claimed in claim 1, wherein the array of micro-mirrors is provided with at least a first diffusion area, a second diffusion area and a third diffusion area.

3. The naked eye 3D head-up display device with reflective diffuser sheet as claimed in claim 1, wherein the array of micro-mirrors is provided with at least a first vertical diffusion area.

4. The naked eye 3D head-up display device with reflective diffuser sheet as claimed in claim 1, wherein each micro-mirror is a concave mirror, a convex mirror or a plane mirror.

5. The naked eye 3D head-up display device with reflective diffuser sheet as claimed in claim 1, wherein a plane or a curved surface is set on the reflective diffuser sheet, the array of micro-mirrors is set the plane or the curved surface.

6. The naked eye 3D head-up display device with reflective diffuser sheet as claimed in claim 1, further includes a reflector, the reflective diffuser sheet is provided to reflect the image light to the reflector, the reflector is provided to reflect the image light to the position of an eye box of the driver.

7. The naked eye 3D head-up display device with reflective diffuser sheet as claimed in claim 1, further includes a reflector and a windshield, the reflective diffuser sheet is provided to reflect the image light to the reflector, the reflector is provided to reflect the image light to the windshield, the windshield is provided to reflect the image light to the position of an Eye Box of the driver.

8. The naked eye 3D head-up display device with reflective diffuser sheet as claimed in claim 1, further includes a reflector and a windshield, the reflector is a concave mirror, which is provided to reflect and enlarge images.

9. The naked eye 3D head-up display device with reflective diffuser sheet as claimed in claim 1, further includes a reflector and a windshield, the reflector is a curved mirror, which is provided to compensate for the influence of the freeform surface of the windshield.

10. The naked eye 3D head-up display device with reflective diffuser sheet as claimed in claim 1, further includes a reflector and a windshield, a reflective film with translucent semi-reflective effect is set on the windshield.

* * * * *